(12) United States Patent
Jha

(10) Patent No.: US 10,708,833 B2
(45) Date of Patent: *Jul. 7, 2020

(54) COMMUNICATION SYSTEM

(71) Applicant: NEC Corporation, Tokyo (JP)

(72) Inventor: Vivek Jha, Bangalore (IN)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/981,385

(22) Filed: Dec. 28, 2015

(65) Prior Publication Data

US 2016/0192256 A1 Jun. 30, 2016

Related U.S. Application Data

(63) Continuation of application No. 13/818,086, filed as application No. PCT/JP2011/075881 on Nov. 2, 2011, now Pat. No. 9,237,497.

(30) Foreign Application Priority Data

Nov. 4, 2010 (GB) .................................. 1018633.6

(51) Int. Cl.
*H04W 8/02* (2009.01)
*H04W 8/08* (2009.01)
*H04W 48/04* (2009.01)
*H04W 8/18* (2009.01)
*H04W 36/08* (2009.01)
(Continued)

(52) U.S. Cl.
CPC ............. *H04W 36/08* (2013.01); *H04W 8/02* (2013.01); *H04W 8/08* (2013.01); *H04W 48/04* (2013.01);
(Continued)

(58) Field of Classification Search
CPC ... H04W 36/00; H04W 36/0005; H04W 8/02; H04W 8/08; H04W 48/04
See application file for complete search history.

(56) References Cited

U.S. PATENT DOCUMENTS

| 8,705,445 | B2* | 4/2014 | Watfa ................ H04W 36/0022 370/328 |
| 2009/0082012 | A1 | 3/2009 | Gallagher et al. |

(Continued)

FOREIGN PATENT DOCUMENTS

| CN | 101521869 A | 9/2000 |
| CN | 101365239 A | 2/2009 |

(Continued)

OTHER PUBLICATIONS

Chinese Office Action dated Mar. 7, 2016 with an English translation thereof.

(Continued)

*Primary Examiner* — Asghar H Bilgrami
(74) *Attorney, Agent, or Firm* — Sughrue Mion, PLLC

(57) ABSTRACT

A base station for communicating with a mobile station, the base station including a processor configured to generate, when the base station is operating as a target base station, a path switch request, and a transceiver circuit configured to transmit, when the mobile station is engaged in a handover to the base station when operating as a target base station, the path switch request to a Mobility Management Entity (MME), wherein the path switch request includes a closed subscriber group (CSG) access mode of the base station operating as a target base station.

11 Claims, 8 Drawing Sheets

(51) Int. Cl.
    *H04W 36/04*     (2009.01)
    *H04W 84/04*     (2009.01)

(52) U.S. Cl.
    CPC ............ *H04W 8/186* (2013.01); *H04W 36/04* (2013.01); *H04W 84/045* (2013.01)

(56) References Cited

U.S. PATENT DOCUMENTS

| | | | |
|---|---|---|---|
| 2009/0257402 | A1 | 10/2009 | Zhu et al. |
| 2010/0130215 | A1 | 5/2010 | Jung et al. |
| 2010/0144317 | A1 | 6/2010 | Jung et al. |
| 2010/0157944 | A1* | 6/2010 | Horn ................. H04W 36/0005 370/331 |
| 2011/0002292 | A1 | 1/2011 | Wang et al. |
| 2011/0075675 | A1 | 3/2011 | Koodli et al. |
| 2011/0223919 | A1 | 9/2011 | Vikberg et al. |
| 2011/0261715 | A1* | 10/2011 | Norefors ............... H04W 60/00 370/252 |
| 2011/0269465 | A1* | 11/2011 | Xu .................... H04W 36/0033 455/436 |
| 2011/0306336 | A1 | 12/2011 | Jung et al. |
| 2012/0039213 | A1* | 2/2012 | Cheng .................. H04W 76/12 370/254 |
| 2012/0039214 | A1 | 2/2012 | Kim et al. |
| 2012/0094674 | A1* | 4/2012 | Wu .................... H04W 36/0055 455/437 |
| 2012/0100852 | A1* | 4/2012 | Horn ................. H04W 36/0055 455/436 |
| 2012/0100861 | A1 | 4/2012 | Zhang et al. |
| 2012/0129515 | A1 | 5/2012 | Jung et al. |
| 2012/0129523 | A1 | 5/2012 | Jung et al. |
| 2012/0142355 | A1 | 6/2012 | Jha |
| 2012/0263147 | A1 | 10/2012 | Takahashi et al. |
| 2012/0264443 | A1* | 10/2012 | Ng ........................ H04W 60/04 455/450 |
| 2012/0294236 | A1 | 11/2012 | Watfa et al. |
| 2013/0084867 | A1* | 4/2013 | Sirotkin ................ H04W 52/04 455/436 |
| 2013/0150037 | A1* | 6/2013 | Jha ....................... H04W 76/36 455/435.1 |
| 2013/0196671 | A1 | 8/2013 | Kubota et al. |
| 2014/0079049 | A1 | 3/2014 | Friman et al. |

FOREIGN PATENT DOCUMENTS

| | | | | |
|---|---|---|---|---|
| CN | 101801054 | A | 8/2010 | |
| CN | 101841874 | A | 9/2010 | |
| CN | 101873627 | A | 10/2010 | |
| EP | 2509362 | * | 4/2009 | ............ H04W 48/02 |
| EP | 2424296 | * | 4/2010 | ............ H04W 36/00 |
| EP | 2 187 664 | A1 | 5/2010 | |
| EP | 2192806 | A2 | 6/2010 | |
| EP | 2389032 | A1 | 11/2011 | |
| EP | 2424296 | A1 | 2/2012 | |
| EP | 2 509 362 | A1 | 10/2012 | |
| GB | 2472791 | A | 2/2011 | |
| JP | 2012-525026 | A | 10/2012 | |
| JP | 2013-526209 | A | 6/2013 | |
| WO | 2009107953 | A2 | 9/2009 | |
| WO | WO2010/081437 | A1 | 7/2010 | |
| WO | WO2010/121558 | A1 | 10/2010 | |
| WO | WO2010/128786 | A2 | 11/2010 | |
| WO | WO2011/013178 | A1 | 2/2011 | |
| WO | WO2011/136534 | A2 | 11/2011 | |

OTHER PUBLICATIONS

Communication dated Mar. 7, 2017, from the State Intellectual Property Office of People's Republic of China in counterpart Application No. 201180041869.5.
"3rd Generation Partnership Project; Technical Specification Group Radio Access Network; Evolved Universal Terrestrial Access Network (E-UTRAN); S1 Application Protocol (S1AP) (Release 8)", 3GPP, Oct. 30, 2007, TS 36.413 V1.1.0, R3-072031-S1APBEARER-MAN, vol. RAN WG3, , 79 pages.
Communication dated Nov. 30, 2017 from the European Patent Office in counterpart Application No. 11 788 923.8.
Office Action dated Feb. 2, 2019 in Chinese Application No. 201610832300.5.
Chinese Office Action dated Sep. 30, 2015 with an English translation thereof.
Alcatel-Lucent, KDDI, "Solution for Inter-HeNB Enhanced Mobility," R3-102278, 3GPP TSG-RAN WG3 #69, Madrid, Spain, Aug. 23-27, 2010.
Russian Office Action dated Jul. 29, 2014 with an English translation thereof.
V. Dorot, et al. Vocabulary of Modern Computer Vocabulary ($2^{nd}$ Edition), BHV-Petersburg, Saint Petersburg, 2001,—D2—p. 339.
Korean Office Action dated Jul. 14, 2014, with English translation.
Catt, "Discussion on the access control for intra-eNB handover", 3GPP TSG-RAN WG3 AH, Beijing, P.R. China, Jun. 29-Jul. 1, 2010, R3-101879.
Chinese Office Action dated Jan. 12, 2015 with an English translation thereof.
3GPP TSG-RAN-WG3#63bis, Huawei, "Discussion of Inbound Handover", Seoul, Korea, Mar. 23-26, 2009.
Japanese Office Action dated Feb. 26, 2014 with an English translation thereof.
International Search Report in PCT/JP2011/075881 dated Feb. 23, 2011 (English Translation Thereof).
3GPP TS 23.401 Technical Specification, $3^{rd}$ Generation Partnership Project; Technical Specification Group Services and System Aspects; "General Packet Radio Service (GPRS) enhancements for Evolved Universal Terrestrial Radio Access Network (E-UTRAN) access" (Release 10), V10.1.0 (Sep. 2010).
3GPP TS 23.060, Technical Specification, $3^{rd}$ Generation Partnership Project; Technical Specification Group Services and System Aspects; "General Packet Radio Service (GPRS); Service description,Stage 2" (Release 8), V8.10.0(Sep. 2010).
3GPP TS 36.413, Technical Specification, $3^{rd}$ Generation Partnership Project; Technical Specification Group Radio Access Network; "Evolved Universal Terrestrial Radio Access Network (E-UTRAN); S1 Application Protocol (S1AP)", (Release 9), V9.4.0(Sep. 2010).
3GPP TS 36.300, Technical Specification, $3^{rd}$ Generation Partnership Project; Technical Specification Group Radio Access Network; "Evolved Universal Terrestrial Radio Access (E-UTRA) and Evolved Universal Terrestrial Radio Access Network (E-UTRAN); Overall description Stage 2" (Release 10), V9.5.0(Sep. 2010).
3GPP TS 23.830 Technical Specification, $3^{rd}$ Generation Partnership Project; Technical Specification Group Services and System; "Architecture aspects of Home NodeB and Home eNodeB", (Release 9), V0.2.1 (Sep. 2009).
Nokia Siemens Networks et al: "Access control for handover procedures to LTE CSG/hybrid cells", 3GPP Draft; R3-092645_ACCCNTR_STAGE2_LTE_CR_FINAL, $3^{rd}$ Generation Partnership Project T3GPP),Mobile Competence Centre; 650, Route Des Lucioles ; F-06921 Sophia-Antipolis, Cedex; France, No. Miyazaki; Oct. 12, 2009, Oct. 12, 2009 (Oct. 12, 2009), XP050392116, [retrieved on Oct. 15, 2009 p. 1, "Reason for change"A sections 4.6.1, 4.6.2, 4.6.x.
Huawei: "Support for CSG based charging", 3GPP Draft; C4-093272 WasAS C4-093250 Was C4-092926-Support CSG Based Charging 29.274 R3, 3rdRD Generation Partnership Project (3GPP), Mobile Competence Centre ; 650, Route Des Lucioles ; F-06921 Sophia-Antipolis Cedex; France, No. Phoenix; Oct. 12, 2009, Oct. 12, 2009 (Oct. 12, 2009), XP050386897, [retrieved on Oct. 18, 2009]p. 1, "Reason for change" section 7.2.1, lines 1 to 3 and 11; section 7.2.7, lines 1 to 3 on p. 11, line 3 on p. 12; section 8.XX tables 7.2.1-1, 7.2.7-1, 8.1-1, 8.XX-I figures 8.XX-I.
Alcatel-Lucent: "Introduction of Enhanced inter-HeNB mobility procedure", 3GPP Draft; R3-101908 HENB36300PROCCR,$3^{rd}$ Generation Partnership Project (3GPP), Mobile Competence Centre;

(56) References Cited

OTHER PUBLICATIONS

650, Route Des Lucioles; F-06921 Sophia-Antipolis Cedex; France, vol. RAN WG3, No. Beijing; Jun. 23, 2010, Jun. 23, 2010 (Jun. 23, 2010) XP050453819, [retrieved on Jun. 23, 2010] section 10.5.x.
Qualcomm Incorporated et al: "Stage 2 for the X2 based mobility enhancement between HeNBs II, "3GPP Draft; R3-103005, 3rd Generation Partnership Project (3GPP), Mobile Competence Centre; 650, Route Des Lucioles; F-06921 Sophia-Antipolis Cedex; France, vol. RAN WG3, No. Xia an, China; Oct. 2010, Oct. 18, 2010 (Oct. 18, 2010), XP050496311,[retrieved on Oct. 18, 2010]p. 2, last two lines.
NEC, "Further work for X2 base mobility for HeNSs", 3GPP Draft; R3-103528, Jacksonville, USA Nov. 15-19, 2010.
NEC, "Further work for X2 based mobility for HeNSs", 3GPP Draft; R3-103529, Jacksonville, USA Nov. 15-19, 2010.
NEC, "[Draft] X2 based HO for HeNSs", 3GPP Draft; R3-103530, Jacksonville, USA Nov. 15-19, 2010.
U.S. Office Action for U.S. Appl. No. 13/818,086 dated Jun. 25, 2014.
U.S. Office Action for U.S. Appl. No. 13/818,086 dated Dec. 1, 2014.
Notice of Allowability for U.S. Appl. No. 13/818,086 dated Sep. 10, 2015.

\* cited by examiner

COMMUNICATION SYSTEM

CROSS-REFERENCE TO RELATED APPLICATIONS

The present application is a Continuation application of U.S. patent application Ser. No. 13/818,086, filed on Jun. 7, 2013, which issued as U.S. Pat. No. 9,237,497, which is based on and claims priority from International Application No. PCT/JP2011/075881, filed on Nov. 2, 2011, which is based on and claims priority from United Kingdom Application No. 1018633.6, filed on Nov. 4, 2010, the entire contents of which are incorporated herein by reference.

TECHNICAL FIELD

The present application relates to mobile telecommunication networks, particularly but not exclusively networks operating according to the $3^{rd}$ Generation Partnership Project (3GPP) standards or equivalents or derivatives thereof. The invention has particular although not exclusive relevance to the management of the handover of a mobile device from one base station to another.

BACKGROUND ART

Under the 3GPP standards, a NodeB (or an eNB in LTE) is the base station via which mobile devices connect to the core network. Recently the 3GPP standards body has adopted an official architecture and started work on a new standard for home base stations (HNB). Where the home base station is operating in accordance with the (Long Term Evolution) LTE standards, the HNB is sometimes referred to as a HeNB. A similar architecture will also be applied in the WiMAX network. In this case, the home base station is commonly referred to as a femto cell. For simplicity, the present application will use the term HNB to refer to any such home base station and will use the term NodeB generically to refer to other base stations (such as the base station for the macro cell in which a HNB operates). The HNB will provide radio coverage (for example, 3G/4G/WiMAX) within the home, small and medium enterprise, shopping Malls etc and will connect to the core network via a suitable public network (for example via an ADSL link to the Internet) or operator network and in the case of the 3GPP standards, via an optional HNB gateway (HNB-GW) which typically will aggregate traffic from several HNBs.

An HNB may be configured to operate using one of a plurality of access modes, namely: 'closed' in which the HNB operates as a closed subscriber group (CSG) cell; 'hybrid' in which the HNB operates as a CSG cell where at the same time, non-members are allowed access; and 'open' in which the HNB operates as a normal (non-CSG) cell.

When the HNB is in the hybrid access mode, and services cannot be provided to a CSG member due to a shortage of HNB resources, established communications of non-members via a CSG cell may be diverted to another cell. Furthermore, to minimise the impact of non-member established communication on CSG members, the network may allow the data rate of established communication of non-members to be reduced.

At the time a connection is established between a mobile device (also known as User Equipment, UE) and a HNB, the HNB sends an initial UE message to the mobility management entity, MME in the core network. Where the HNB is configured to operate in a closed or hybrid mode, the initial UE message includes a closed subscriber group identifier, CSG-Id, for the UE. The MME performs access control based on the CSG-Id received in the initial UE message and stores specific information for the UE in a database, such as an MM or EPS bearer context. The MME actions for UE specific procedures, such as account charging, CSG membership change or paging optimisation are different depending on whether the UE is connected to a closed or hybrid cell. Details of these UE specific procedures are described in the 3GPP Standard TS 23.401 version 10.1.0 (2010 Sep. 29): "General Packet Radio Service (GPRS) enhancements for Evolved Universal Terrestrial Radio Access Network (E-UTRAN) access" and in 3GPP Standard TS 23.060: "General Packet Radio Service (GPRS); Service description; Stage 2".

A recent proposal has been made that if a UE moves from one HNB to another HNB belonging to the same closed subscriber group, then the MME does not need to perform access control for the new HNB. However, the inventors have identified a problem with this proposal when one HNB is operating in the closed subscriber group access mode and the other HNB is operating in the hybrid mode. Thus there exists a need to adapt the recent proposals to overcome this problem.

Although for efficiency of understanding for those of skill in the art, the invention will be described in detail in the context of a 3G system (UMTS, LTE), the principles of the invention can be applied to other systems (such as WiMAX) in which mobile devices or User Equipment (UE) communicate with one of several base stations with the corresponding elements of the system changed as required.

DISCLOSURE OF INVENTION

Accordingly, preferred embodiments of the present invention aim to provide methods and apparatus which overcome or at least alleviate the above issues.

In an aspect there is provided a base station for communicating with a plurality of mobile devices and a core network, the base station operating according to an associated subscriber group access mode and comprising: a closed subscriber group management module configured to store a subscriber group identifier of the base station; a connection management module configured to perform a handover process comprising: transferring a communication link associated with a mobile device between the base station and another base station, the other base station belonging to the same subscriber group as the base station and operating according to a different subscriber group access mode, the handover process further comprising transmitting, to the core network, data indicating the subscriber group access mode of the base station to which the communication link is transferred. Preferably the handover process is an X2 based handover, e.g. the handover process makes use of the X2 signalling interface for signalling between base stations.

In one possibility transferring a communication link associated with a mobile device comprises transferring the communication link from the base station to another base station. In another possibility transferring a communication link associated with a mobile device comprises transferring the communication link to the base station from another base station.

In one possibility transmitting, to the core network, data indicating the access mode of the base station comprises transmitting a path switch request. In other possibilities data indicating the access mode of the base station may be transmitted in a dedicated message.

In one possibility the path switch request comprises the access mode data associated with the base station to which the communication link is transferred and a downlink address to enable communication with the mobile device. Preferably said path switch request comprises a tunnel end point identifier, for example a GPRS tunnelling protocol tunnel endpoint identifier.

In one possibility the base station operates according to one of an open, closed or a hybrid subscriber group access mode and the other base station operates in a respective other one of the open, closed and hybrid subscriber group access modes. For example, the subscriber group access mode of one base station (e.g. source or target) is closed and the subscriber group access mode of the other base station (e.g. the respective other one of the source and target) is hybrid.

In an aspect there is provided a mobility management entity for a communications network comprising a core network and a plurality of base stations, said mobility management entity comprising: communication means, adapted to store an association between a mobile device and at least one of a plurality of base stations, via which the mobile device connects to the core network, to control communication between the core network and the mobile device; a controller, configured to update the stored association in the event that said mobile device is handed over from said at least one base station to another base station, wherein the other base station belongs to the same closed subscriber group but operates in a subscriber group access mode different to the subscriber group access mode of the at least one base station, wherein the updated association includes data indicating the subscriber group access mode of the other base station.

In one possibility the controller is configured to receive said data indicating the subscriber group access mode of the other base station from said at least one base station. In one possibility the controller is configured to receive said data indicating the subscriber group access mode of the other base station from the other base station.

In one possibility the controller is configured to retrieve data indicating the subscriber group access mode of the other base station from a request to handover said mobile device from said at least one base station to another base station. For example, said request may comprise a value indicating a downlink address to enable data to be transmitted from the core network to the mobile device. In one possibility the controller is configured to establish a communication link with the mobile device via the base station based on the downlink address. In an example the communication link comprises a GPRS tunnel and the request comprises a tunnel end point identifier, such as a GPRS tunnelling protocol tunnel endpoint identifier.

In some possibilities the controller is configured to create said stored association between the mobile device and the base station, via which the mobile device connects to the core network, in response to an initiation message received from the at least one base station.

In some possibilities the controller is configured to retrieve stored data indicating the subscriber group access mode of the other base station. In an example retrieving stored data comprises retrieving the data from a database. In one possibility the mobility management entity comprises the database. In one possibility the controller is configured to retrieve the stored data from a database in a core network associated with the mobility management entity.

In one possibility the controller is configured to retrieve the data from a gateway coupling the mobility management entity to at least one of: the at least one base station and the other base station. In one possibility the controller is configured to retrieve data from the other base station.

In one possibility the controller is configured to retrieve the value indicating the access mode of the second base station from the at least one base station via which the mobile device connects to the core network.

In some possibilities the mobility management entity is configured to transmit data to the core network in the event that said mobile device is handed over from said at least one base station to said other base station, wherein the data transmitted to the core network comprises data indicating the subscriber group access mode of the other base station.

In one possibility the message comprises an identifier of a base station and a cell access mode value indicating the access mode associated with the base station.

Aspects of the invention include a communications system comprising: a mobile device; and a plurality of base stations as in the aspects and possibilities described above; and a mobility management entity according to any of the aspects and possibilities described above.

In an aspect there is provided a base station for communicating with a plurality of mobile devices and a core network, the base station having an associated subscriber group access mode and comprising: a closed subscriber group management module configured to store a subscriber group identifier of the base station; a handover module configured to perform a handover process comprising: transferring a communication link associated with a mobile device from the base station to a target base station, the target base station belonging to the same subscriber group as the base station and operating according to a different subscriber group access mode, the handover process further comprising transmitting, to the core network, data indicating the subscriber group access mode of the target base station to which the communication link is transferred.

In an aspect there is provided a base station for communicating with a plurality of mobile devices and a core network, the base station having an associated subscriber group access mode and comprising: a closed subscriber group management module configured to store a subscriber group identifier of the base station; a handover module configured to perform a handover process comprising: transferring a communication link associated with a mobile device to the base station from a source base station, the source base station belonging to the same subscriber group as the base station and operating according to a different subscriber group access mode, the handover process further comprising transmitting, to the core network, data indicating the subscriber group access mode of the base station to which the communication link is transferred.

In an aspect there is provided a method of operating a base station for communicating with a plurality of mobile devices and a core network, the base station having an associated subscriber group access mode, the method comprising: transferring a communication link associated with a mobile device between the base station and another base station the other base station belonging to the same subscriber group as the base station and operating according to a different subscriber group access mode; and, transmitting to the core network, data indicating the subscriber group access mode of the base station to which the communication link is transferred. In one possibility transferring a communication link associated with a mobile device comprises transferring the communication link from the base station to another base station. In one possibility transferring a communication link associated with a mobile device comprises transferring the communication link to the base station from another base station.

In an aspect there is provided a method of operating a mobility management entity for a communications network, the method comprising: storing an association between a mobile device and at least one of a plurality of base stations, via which the mobile device connects to a core network, to control communication between the core network and the mobile device; updating the stored association in the event that said mobile device is handed over from said at least one base station to another base station, the other base station belonging to the same subscriber group as the at least one base station and operating according to a different subscriber group access mode, wherein updating includes updating data indicating the subscriber group access mode of the other base station.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

BRIEF DESCRIPTION OF DRAWINGS

Embodiments of the invention will now be described, by way of example, with reference to the accompanying drawings in which.

BEST MODE FOR CARRYING OUT THE INVENTION

Overview

Figure 1:
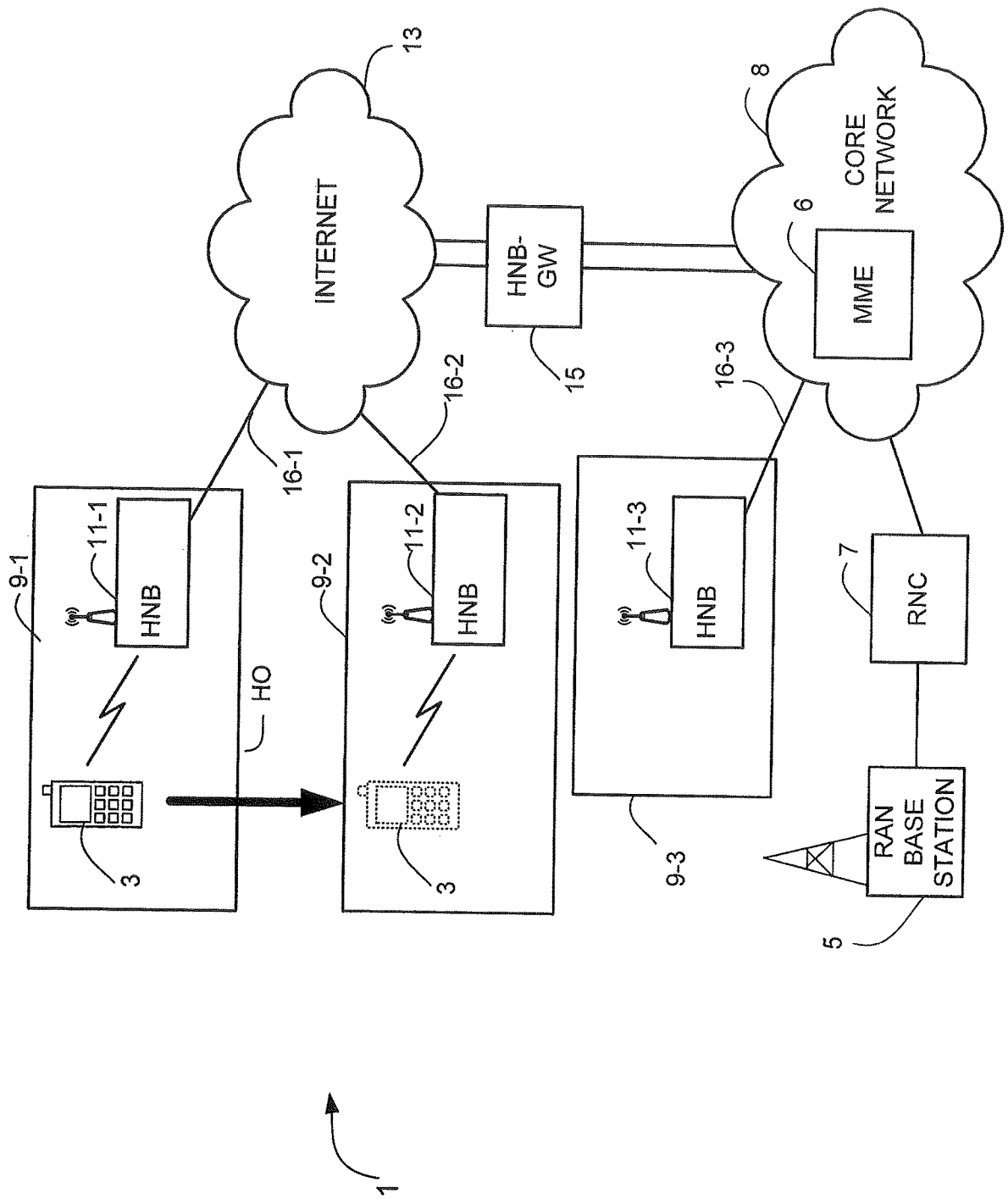
FIG. 1 schematically illustrates a mobile telecommunication system.

FIG. 1 schematically illustrates a mobile (cellular) telecommunication system 1 in which a user of a mobile telephone 3 can communicate with other users (not shown) via a macro cell of a 3G Radio Access Network (RAN) base station 5, a Radio Network Controller (RNC) 7 and a core telephone network (a core network) 8 when the user is away from a 'home' base station (HNB) 11-1 based a cell 9-1, which he may be permitted to access. The HNB 11-1 is coupled by a public data network (in this example the internet 13) and a home base station gateway (HNB-GW) 15, to the core telephone network 8. In the telecommunication system 1 the user may also communicate with the other users (not shown) via the cell 9-2 of an HNB 11-2 which, in this example, is also coupled by the internet 13, via the same home base station gateway (HNB-GW) 15, to the core telephone network 8.

In the example of FIG. 1, the HNBs 11-1 and 11-2 connect to a common HNB-GW 15 via a suitable Internet connection such as an ADSL or cable connection 16 (16-1 and 16-2) and are programmed with the IP address of the HNB-GW 15 so that all uplink communications are transmitted via HNB-GW 15. HNB 11-3 provides a further cell 9-3 in which a user may connect via HNB 11-3 and a suitable internet connection such as an ADSL or cable connection 16 (16-3) to the core telephone network 8 without connecting to HNB-GW 15.

In this example, the HNBs 11-1 and 11-2 belong to the same closed subscriber group (e.g. are configured to provide communications for mobile devices which are members of that closed subscriber group) but are configured to operate using different access modes. HNB 11-1 operates according to a 'closed' mode in which only the members of a closed subscriber group (CSG) associated with the HNB 11-1 are allowed access. HNB 11-2 operates according to a 'hybrid' mode in which both members and non-members of a CSG associated with the HNB 11-2 are allowed access.

As is well known, a mobile telephone 3 may be transferred from a cell 9-1 associated with a first HNB 11-1 to a second cell 9-2 associated with a second HNB 11-2. The process of performing the handover HO is illustrated schematically in FIG. 1 and described in more detail below with reference to FIG. 6. The core network 8 comprises a mobility management entity (MME) 6 which is in communication with the HNBs 11-2, 11-2, RAN base station 5 and other NodeBs (not shown in FIG. 1). The MME 6 keeps track of mobile devices and their connections to the base stations as they move through the network in a database of MM and EPS bearer contexts.

Mobile Telephone

Figure 2:
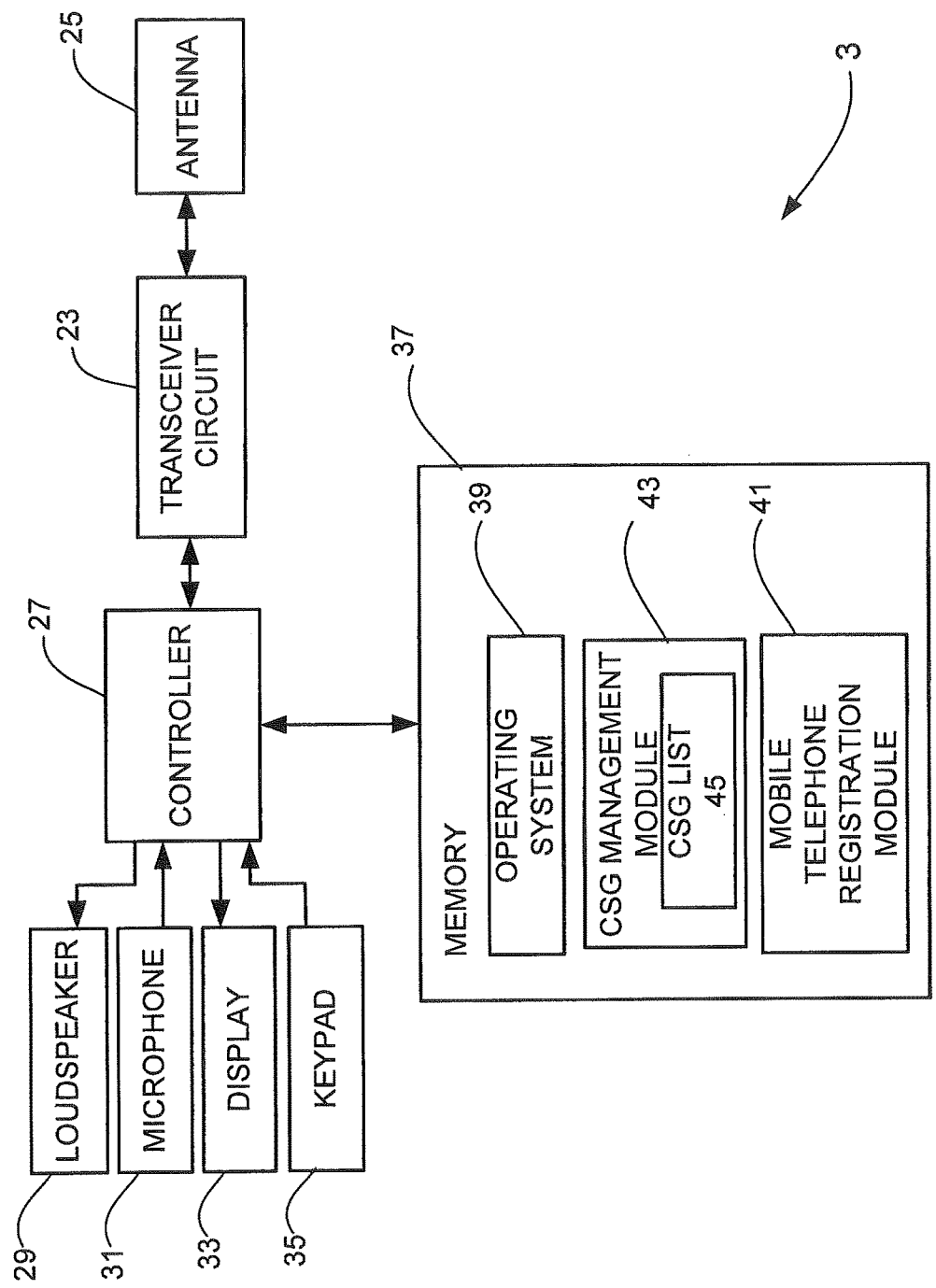
FIG. 2 is a block diagram of a mobile telephone forming part of the system shown in FIG. 1.

FIG. 2 schematically illustrates the main components of the mobile telephone 3 shown in FIG. 1. As shown, the mobile telephone 3 includes transceiver circuitry 23 which is operable to transmit signals to and to receive signals from the RAN base station 5 or an HNB 11 via one or more antennae 25. As shown, the mobile telephone 3 also includes a controller 27 which controls the operation of the mobile telephone 3 and which is connected to the transceiver circuit 23 and to a loudspeaker 29, a microphone 31, a display 33, and a keypad 35. The controller 27 operates in accordance with software instructions stored within memory 37. As shown, these software instructions include, among other things, an operating system 39, a mobile telephone registration module 41, and CSG management module 43.

In this embodiment the mobile telephone registration module 41 allows selection of the home base station 11-1, 11-2 when the mobile telephone 3 is within range of the HNB 11-1, 11-2; and the CSG management module 43 maintains at least one list 45 containing details of the CSGs of which the mobile telephone 3 is a member (e.g. an operator controlled 'Allowed CSG list' and/or a user controlled a 'User CSG list').

It will be appreciated that the selection of the home base station 11-1, 11-2 may be automatic or may be manually controlled by the user and that the CSG list 45 may be stored in the memory 37 of the mobile telephone 3 and/or in a Universal Subscriber Identity Module (USIM) (not shown).

An HNB 11-1, 11-2 selected for connection may operate in a closed, hybrid or open access mode. If the HNB operates in a closed or hybrid mode it has an associated CSG of which the mobile telephone 3 is a member, the mobile telephone registration module 41 of the mobile telephone 3 is operable to generate a connection request (e.g. an RNC Connection Request) for initiating connection to the HNB 11-1, 11-2 which request includes information identifying whether the mobile telephone 3 is a member of the closed subscriber group to the HNB 11-1, 11-2 in question.

Home Base Station

Figure 3:
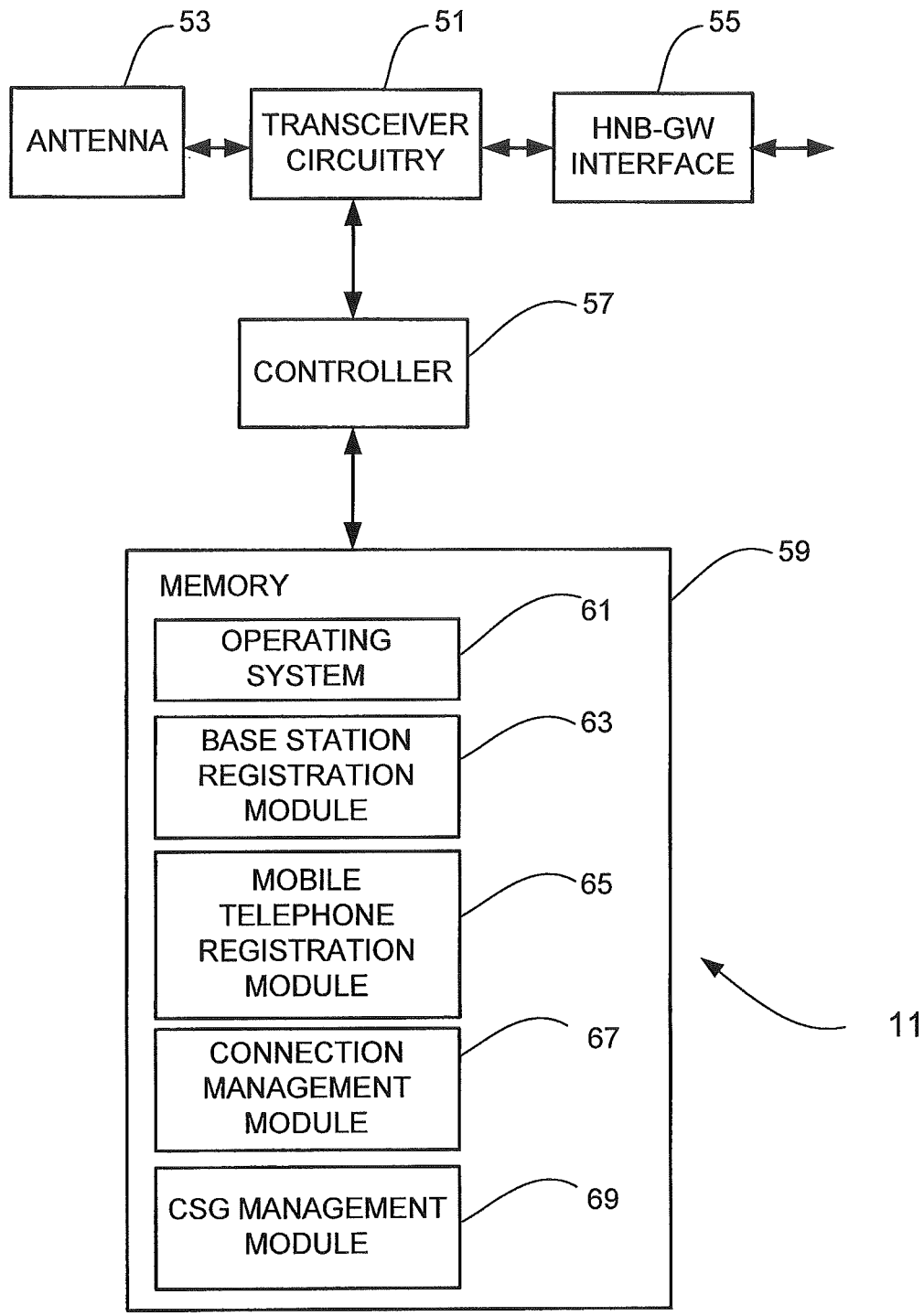
FIG. 3 is a block diagram of a home base station forming part of the system shown in FIG. 1.

FIG. 3 is a block diagram illustrating the main components of one of the home base stations (HNB) 11 shown in FIG. 1. As shown, the HNB 11 includes transceiver circuitry 51 which is operable to transmit signals to, and to receive signals from, the mobile telephone 3 via one or more antennae 53 and which is operable to transmit signals to and to receive signals from the HNB-GW 15 via an HNB-GW interface 55. The operation of the transceiver circuitry 51 is controlled by a controller 57 in accordance with software stored in memory 59. The software includes, among other things, an operating system 61, a base station registration module 63, a mobile telephone registration module 65, a connection management module 67 and a CSG management module 69.

The base station registration module 63 is operable to register the HNB with the HNB-GW 15 and the mobile telephone registration module 65 is operable to register the mobile telephone 3 with the HNB 11 and with the HNB-GW 15. The connection management module 67 is operable to manage the connections of mobile telephones camped on the cell 9 of the HNB 11 and to broadcast system information relating to the cell 9, to mobile telephones 3 in the vicinity. The connection management module 67 is configured to transmit a message to inform the MME 6 in the core network 8 of the CSG access mode of the HNB 11 on initial UE attach and during a handover of a mobile telephone (UE) 3 between HNBs 11-1, 11-2.

The CSG management module 69 is operable for configuring the HNB 11 to operate under one of the CSG access modes ('closed, 'hybrid', or 'open') and for setting up CSGs associated with the HNB 11.

HNB Gateway

Figure 4:
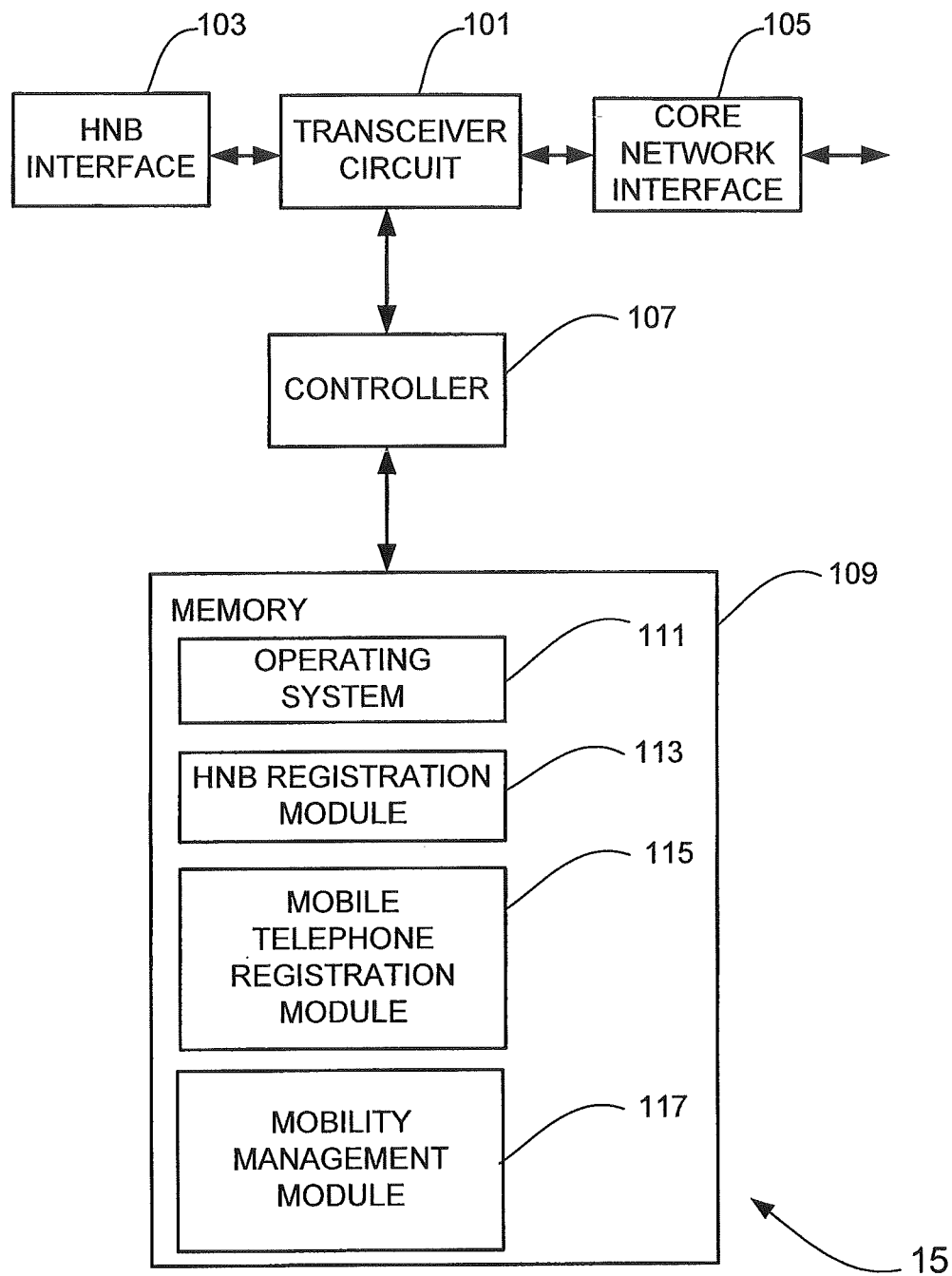
FIG. 4 is a block diagram of a home base station gateway forming part of the system shown in FIG. 1.

FIG. 4 is a block diagram illustrating the main components of the HNB gateway (HNB-GW) 15 shown in FIG. 1. As shown, the HNB-GW 15 includes a transceiver circuit 101 which is operable to transmit signals to, and to receive signals from, the HNB 11-1, 11-2 via the HNB interface 103 and which is operable to transmit signals to and to receive signals from the core network 8 via a core network interface 105. The operation of the transceiver circuit 101 is controlled by a controller 107 in accordance with software stored in memory 109. The software includes, among other things, an operating system 111, an HNB registration module 113, a mobile telephone registration module 115, and a mobility management module 117. The HNB registration module 113 is operable to control the registration of HNBs 11-1, 11-2 with the gateway and the mobile telephone registration module 115 is operable to control the registration of the mobile telephone 3 and to perform access control as required. The mobility management module 117 is operable to manage relocation from one cell to another and in particular: intra-HNB-GW relocation of a mobile telephone 3 from a cell 9-1 of an HNB 11-1 connected via the HNB-GW 15 to a cell 9-2 of a HNB 11-2, or a cell 9-3 of HNB 11-3 and vice versa; and relocation of a mobile telephone 3 from a cell 9 of an HNB 11-1, 11-2 connected via the HNB-GW 15 to a macro cell, and vice versa.

The MME

Figure 5:
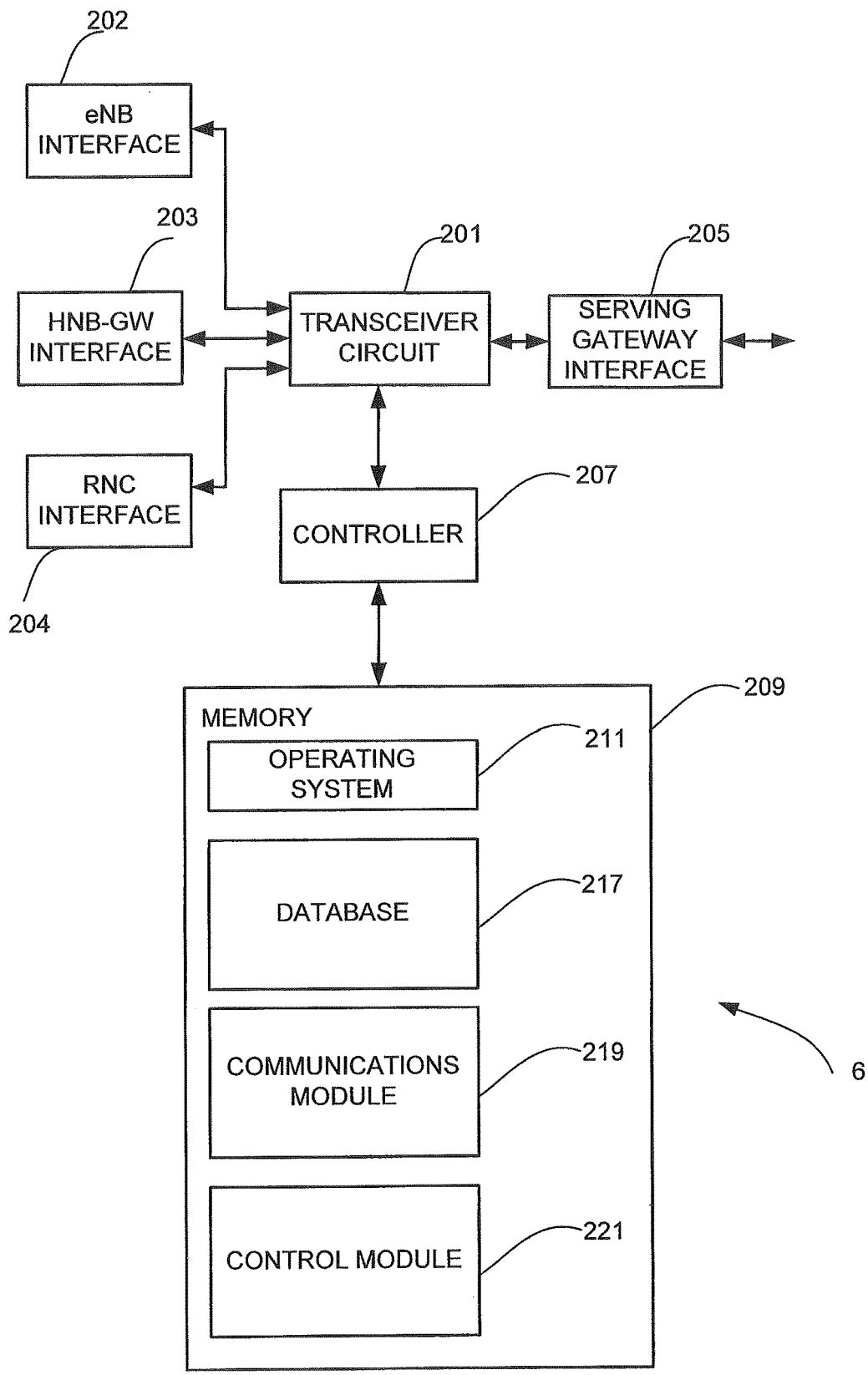
FIG. 5 is a block diagram of a mobility management entity forming part of the system shown in FIG. 1.

FIG. 5 shows an MME 6 having a transceiver circuit 201 coupled to an eNB interface 202, a HNB-GW interface 203 and an RNC interface 204 and a serving gateway interface 205.

A controller 207 is coupled to control the transceiver circuit 201 and is coupled to a memory comprising software including, among other things an operating system 211, a communications module 219, a control module 221 and a database 217.

The communications module 219 is operable to communicate with RNCs 7 via the RNC interface 204, with HNB-GWs 15 via the HNB-GW interface 203 and with eNBs via the eNB interface 202. Communication between the MME 6 and a serving gateway is conducted via the serving gateway interface 205.

The control module 221 is operable to record in the database 217 an association between a mobile device (mobile telephone) and an eNB, such as HNB 11-1, and to update that association as the mobile device (mobile telephone) is handed over from one HNB 11-1 to another HNB 11-2. In effect the MME acts as a control-node for the network and is responsible for tracking the location of mobile devices (mobile telephones) 3 as they move within the network. The MME also controls a paging procedure and chooses the serving gateway to be used by a mobile device (mobile telephone) when it is initially attached and at time of intra-LTE handover involving Core Network node relocation. It is also involved in the bearer activation/deactivation process.

When a UE (mobile telephone) 3 first accesses a CSG or hybrid cell, the MME 6 performs access control based on a CSG identifier received in the initial UE Message. The MME 6 keeps UE specific information in MME MM and EPS bearer Contexts stored in the database 217.

In the above description, the mobile telephone 3 and the home base stations 11-1, 11-2 and the HNB-GW 15 are described, for ease of understanding, as having a number of discrete modules (base station/telephone registration modules, the parameter control module, and the connection/CSG management modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

X2 Based Handover

An X2 based handover of a UE (mobile telephone) 3 between home base stations 11-1 and 11-2 will now be described, by way of example only, with reference to the timing diagram of FIG. 6.

As those skilled in the art will appreciate, the X2 interface is the interface via which base stations communicate with each other. In an X2 based handover the handover process is coordinated between the source and target base stations without overall control by the core network. X2 based handover is therefore advantageous as it reduces load on the core network.

Figure 6:
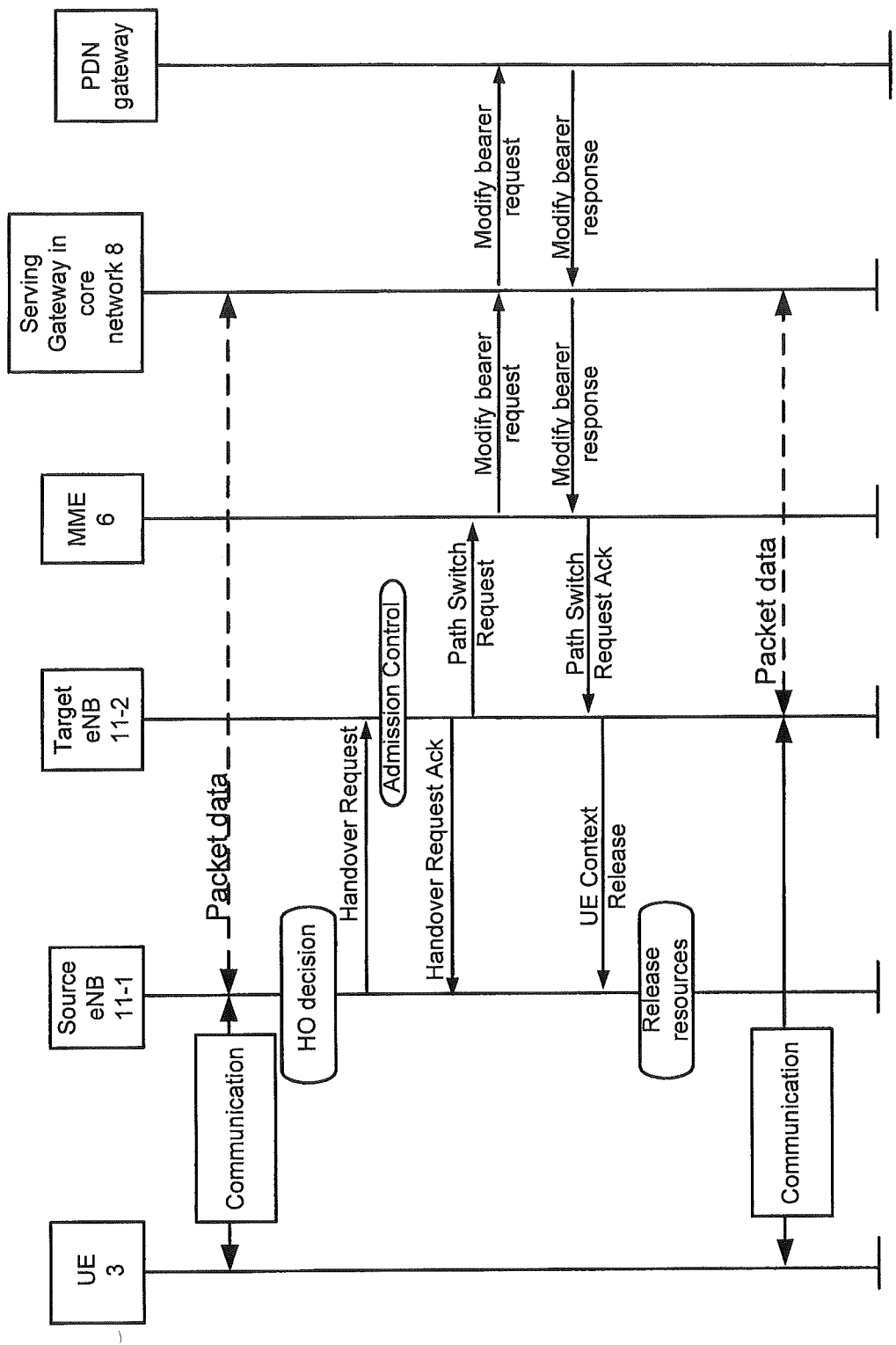
FIG. 6 is a timing diagram indicating a handover procedure by which communication with a mobile device is transferred between a source and target home base station.

As shown in FIG. 6, once a UE 3 establishes communication with a source HNB 11-1 the source HNB 11-1 relays packet data between the UE 3 and the serving gateway of the core network 8 (via the HNB-GW 15). During communication between the UE 3 and source HNB 11-1 properties of the communication between the UE 3 and the HNB 11-1 and other base stations are measured to assist in control of the UE's connection mobility. The HNB 11-1 is operable to trigger the UE 3 to send a measurement report to the HNB 11-1.

Based on the measurement report information and/or other radio resource management (RRM) information, the source HNB 11-1 can determine whether or not to hand the UE 3 off to a target HNB 11-2. In the event that it is determined that the UE 3 is to be handed off to a target HNB 11-2, the source HNB 11-1 transmits a handover request to the target HNB 11-2 which includes information necessary for the target HNB 11-2 to prepare the handover, such as information relating to quality of service and other parameters.

The target HNB 11-2 may perform admission control functions dependent on the received information and, if the necessary resources can be granted by the target HNB 11-2, then the target HNB 11-2 configures the required resources to provide the required quality of service etc. Once the physical and link layer (L1 & L2) resources have been configured, the target HNB 11-2 sends a handover request acknowledgement message to the source HNB 11-1. The handover request acknowledgement message includes a transparent container to be sent to the UE as a radio resource control, RRC, message to perform the handover.

Once the source HNB 11-1 has received the handover request acknowledgement, or as soon as the transmission of the handover command is initiated in the downlink, data forwarding can be performed so that data received at the source HNB 11-1 is forwarded to the target HNB 11-2 to be relayed to the UE 3.

As the source and target HNBs 11 have the same CSG ID, then the MME 6 does not need to perform access control when the UE moves to the target HNB 11-2. However, because the source and target HNBs 11-1, 11-2 have different access modes the MME is informed of the access mode for the target HNB 11-2 so that the MME 6 can update the data stored for the UE in database 217 to enable management of paging and charging procedures. In this embodiment the target home base station (HNB) 11-2 (the base station to which the communication link is transferred) informs the MME using the path switch request. However other procedures may be used, for example there may be dedicated signalling between the MME and source or target base station (eNB or HeNB) to inform the MME of the subscriber access mode of the target base station.

The purpose of the path switch request procedure is to request that the downlink GTP (GPRS tunnelling protocol) tunnel is directed to a GTP tunnel endpoint at the target HNB 11-2. In this embodiment this path switch request is amended to include data indicating the access mode of the target HNB 11-2.

An example of a path switch request message is set out in Table 1. In Table 1 the following abbreviations are used: E-RAB is used to indicate the evolved UMTS Terrestrial Radio Access Network-Radio Access Bearer; IE is used to indicate an information element; GTP-TEID is used to indicate a GPRS tunnelling protocol Tunnel Endpoint Identifier; E-UTRAN CGI is used to indicate the evolved UMTS Terrestrial Radio Access Network Cell Global Identity.

TABLE 1

| IE/Group Name | Presence | Range | Semantics description | Criticality | Assigned Criticality |
|---|---|---|---|---|---|
| Message Type | M | | | YES | reject |
| eNB UE S1AP ID | M | | | YES | reject |
| E-RAB To Be Switched in Downlink List | | 1 | | YES | reject |
| >E-RABs Switched in Downlink Item IEs | | 1 to <maxnoof E-RABs> | | EACH | reject |
| >>E-RAB ID | M | | | — | |
| >>Transport layer address | M | | | — | |
| >>GTP-TEID | M | | To deliver DL PDUs | — | |
| Source MME UE S1AP ID | M | | | YES | reject |
| E-UTRAN CGI | M | | | YES | ignore |
| TAI | M | | | YES | ignore |
| UE Security Capabilities | M | | | YES | ignore |
| Cell Access Mode | O | | | | |

In response to the path switch request the MME transmits an update bearer request or a create session request to the serving gateway which may in turn relay this request to a packet data network gateway.

In the example described above with reference to FIG. 6 the source and target HNBs are served by the same serving gateway in the core network. In this case, as shown in FIG. 6 a modify bearer request message is sent from the MME to the serving gateway and from the serving gateway to the PDN gateway. As shown in FIG. 6 these messages are acknowledged by the serving gateway and by the PDN gateway. In the example shown in FIG. 7 the source and target base stations (e.g. HNB 11-1, 11-3) are served by different serving gateways. In this example, to perform serving gateway relocation the MME sends a create session request to the target serving gateway. The target serving gateway then sends a modify bearer request message to the PDN gateway. Once this has been done and the target base station has sent a release resource message to the source base station the MME sends a delete session request to the source serving gateway.

Figure 7:
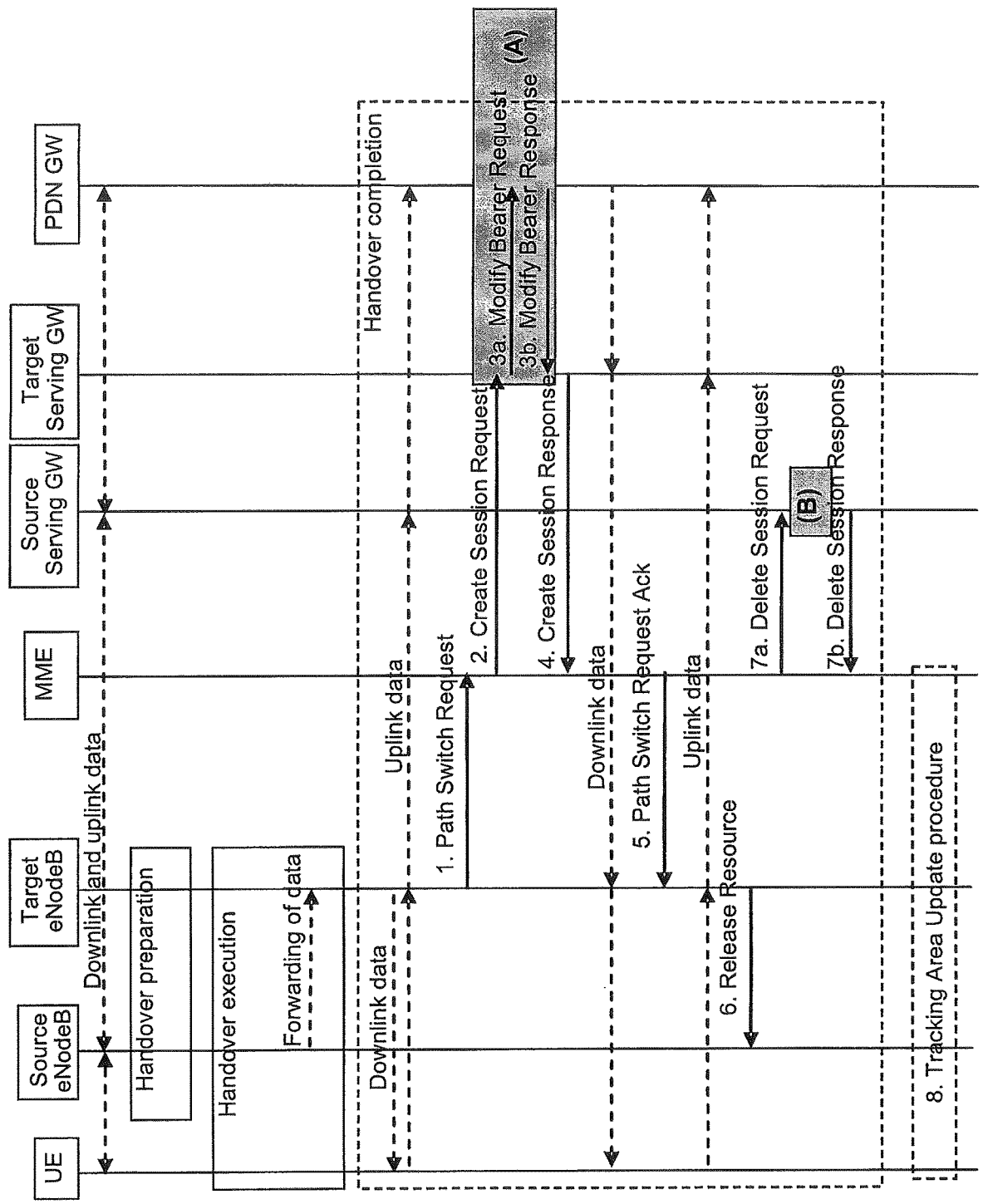
FIG. 7 is a timing diagram indicating a handover procedure by which communication with a mobile device is transferred between source and target home base stations served by different serving gateways in the core network.

In the example described with reference to FIG. 6, and the example described with reference to FIG. 7 the modify bearer request message and the create session request both contain data indicating the subscriber group access mode of the target base station. This information is used to manage paging optimisation and charging for the UE 3 in the core network.

After the down link path is switched in the core network, packets destined for the UE 3 are sent to the target HNB 11-2 and the resources previously reserved at the source HNB 11-1 for the connection to the UE can be released although any ongoing data forwarding may continue.

If the MME 6 receives a change in the cell access mode in the path switch request then the MME 6 stores an indication of the new cell access mode for the UE in an MM or EPS bearer context in the MME database 217 (FIG. 5). The MM or EPS bearer contexts are used to store parameters representing an EPS bearer between a UE and a public data network, PDN.

Modifications and Alternatives

A number of detailed embodiments have been described above. As those skilled in the art will appreciate, a number of modifications and alternatives can be made to the above embodiments whilst still benefiting from the inventions embodied therein.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the embodiments described above, the mobile telephone and the HNB each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the HNB or to the mobile telephone as a signal over a computer network, or on a recording medium. Further, the functionality performed by part or all of this software may be performed using one or more dedicated hardware circuits. However, the use of software modules is preferred as it facilitates the updating of the base stations, gateways, and the mobile telephones in order to update their functionalities.

The description of the handover process provided above has been given with specific reference to home NodeBs however embodiments of the invention may be applied to other base stations such as eNodeBs or RAN base stations.

In the specific example described with reference to FIG. 1 the HNB 11-1 operates according to a 'closed' mode in which only the members of a closed subscriber group (CSG) associated with the HNB 11-1 are allowed access. However in other possibilities it may operate in a 'hybrid' mode in which both members and non-members of a CSG associated with the HNB 11-1 are allowed access whilst the HNB 11-2 operates according to a 'closed' mode. In other words, the source HNB may operate in either an open, closed or a hybrid subscriber group access mode, whilst the target operates in a respective other one of the open, closed and hybrid subscriber group access modes.

In the specific example described above with reference to FIGS. 6 and 7 the handover procedure is described with reference to a handover between two home base stations which are connected to the MME via a HNB-GW 15. However, in other embodiments the same handover procedure may be used in handovers between two base stations in the following scenarios: one or both the base stations involved in the handover are directly connected to the MME 6 in the core network 8 instead of being connected via a HNB-GW 15 (as for HNB 11-3 in FIG. 1); or one or both base stations involved in the transfer may be a macro base station (e.g. an eNodeB or the base station 5 as shown in FIG. 1) instead of a home base station 11-1, 11-3.

In the specific example described with reference to FIG. 6, the target base station (to which the communication link is transferred) informs the MME 6 of the subscriber group access mode in which it is operating. However, in other examples the source base station may inform the MME of the subscriber group access mode of the target base station. In another embodiment the MME may only be told the identity of the target HNB and in response the MME may retrieve information on the subscriber group access mode for the target HNB from a database, either within the MME or the core network, or in one of the base stations or a base station gateway.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

Overview: The invention concerns handover between Home eNBs. It has been agreed in 3GPP that when a UE belonging to a Closed Subscriber Group is handed over to another HeNB which supports the same CSG, this handover can be performed by the source and target HeNBs without requesting authentication from the Mobility Management Entity. However we have identified a problem with this in the case that the source and target HeNBs operate in different access modes (open, closed or hybrid), because the MME needs to know the access mode of the HeNB currently serving each UE. This document proposes a solution in which the target HeNB informs the MME of its access mode by adding a new IE to an existing message.

1. 1 Introduction

This paper discusses the further work in order to support the X2 based mobility for enhanced HeNB mobility. During the RAN3#69bis meeting, RAN3 agreed for the support of X2 based mobility between HeNBs in the following cases.

Between two open access HeNBs;
Between two closed/hybrid HeNBs only if they have the same CSG ID
From closed/hybrid HeNB to open access HeNB;

The above agreement is reflected in stage-2 text as below

X2-based HO between HeNBs is allowed if no access control at the MME is needed, i.e. when the handover is between closed/hybrid access HeNBs having the same CSG ID or when the target HeNB is an open access HeNB.

The goal for the next RAN3 meeting is to look for further stage-2 and stage-3 issues.

The above agreed mobility scenarios for HeNBs although looks like Macro eNB X2 based mobility and supposedly work in the same framework as captures in the various specifications. However there are certain topics that are only relevant to this scenario. This paper addresses these specific scenarios.

2. 2 Description

When the UE first access the closed cell, MME performs the access control based on the CSG ID received in the INITIAL UE Message.

According to 36.413, clause 8.6.2.1—If the establishment of the UE-associated logical S1-connection towards the CN is performed due to an RRC connection establishment originating from a CSG cell, the CSG Id IE shall be included in the INITIAL UE MESSAGE message.

When the UE first access the hybrid cell, MME performs the membership check based on the CSG ID received in the INITIAL UE Message.

According to 36.413, clause 8.6.2.1—If the establishment of the UE-associated logical S1-connection towards the CN is performed due to an RRC connection establishment originating from a Hybrid cell, the CSG Id IE and the Cell Access Mode IE shall be included in the INITIAL UE MESSAGE message.

MME keeps the UE specific information in MME MM and EPS bearer Contexts (subclause 5.7.2-1 of TS 23.401) ECM-IDLE, ECM-CONNECTED and EMM-DEREGISTERED states.

IMSI
IMSI-unauthenticated-indicator
MSISDN
MM State
GUTI
ME Identity
Tracking Area List
TAI of last TAU
E-UTRAN Cell Global Identity
E-UTRAN Cell Identity Age
CSG ID
CSG membership
Access mode The MME actions for the UE specific procedures are different depending on whether the UE is connected to the closed cell or hybrid cell in many cases for example CSG membership change (subclause 5.16 of TS 23.401), Paging optimization (subclause 4.3.13 of TS 23.401), Charging etc.

One of the fundamental principles applied for the mobility scenarios for HeNBs that the MME does not need to perform the access control i.e. target HeNB should be either of the same CSG ID or an open HeNB. In other words, MME is informed about the X2 based mobility only during the path switch in order to perform the user plane switch.

In the current framework of the X2 based HO, for the specific scenario when UE moves between two HeNBs i.e. Intra CSG but different access mode i.e. closed <=> Hybrid, the above Access mode and CSG membership will not be updated in the MME because there is no additional indications are provided to the MME by H(e)NB during the path switch.

Therefore, for current frame work of the X2 based mobility (to be applied for HeNBs) it is necessary to discuss following:

1. How the MME will be informed the UE is moved from closed mode cell to Hybrid mode cell and vice versa (within the same CSG).

Figure 8:
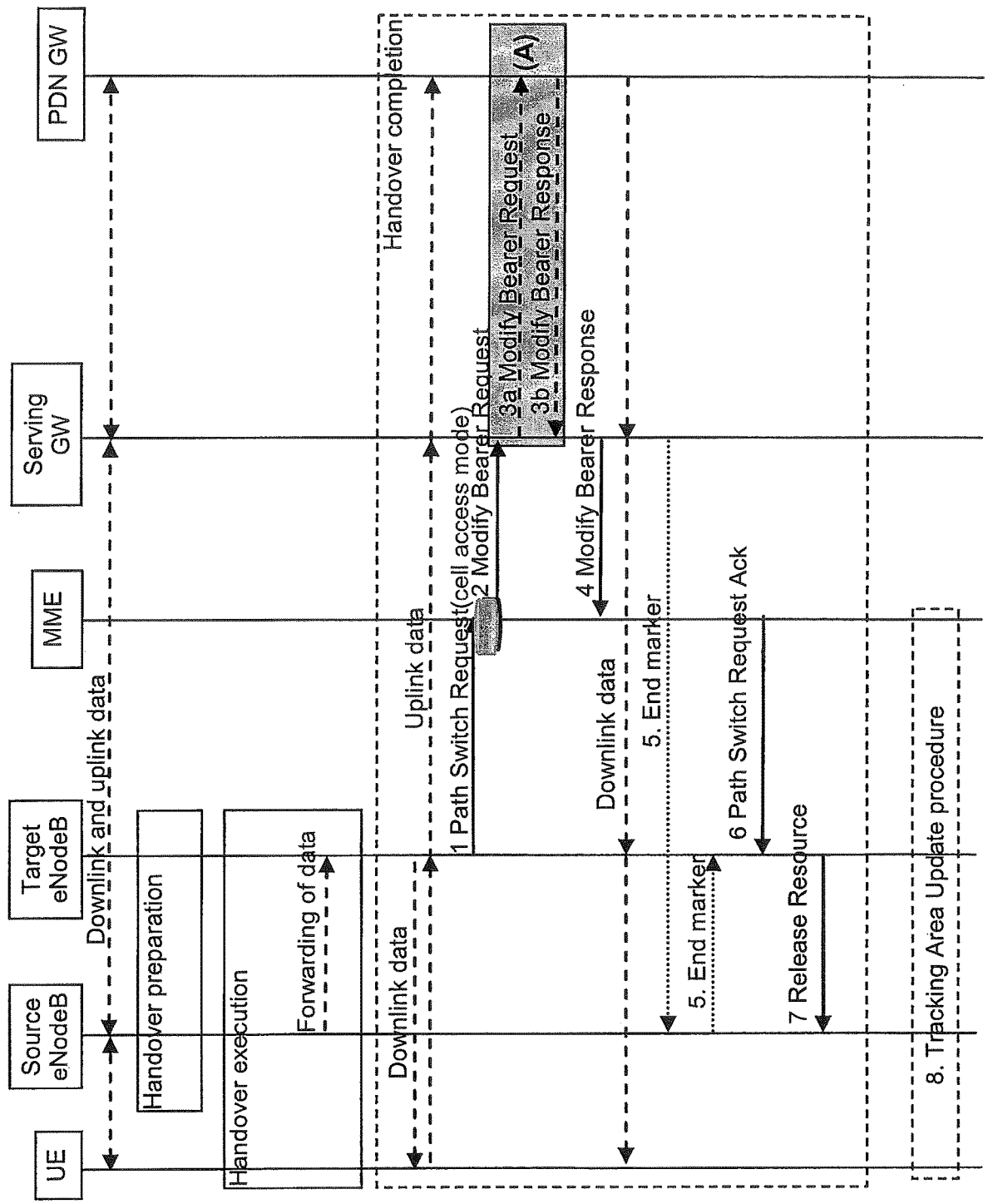
FIG. 8 is a timing diagram indicating a handover procedure by which communication with a UE is transferred between source and target home base stations served by different serving gateways in the core network.

Solution: The above issue needs discussions in RAN3. In order to inform the MME the UE is moved to another cell, and the target cell belongs to the different access mode, SLAP Path Switch procedure could be enhanced so that the target (H)eNB would be able to indicate its own Cell Access mode to the MME during the X2 based HO (see FIG. 8).

Proposal 1: During the X2 based HOs for the (H)eNB, the target (H)eNB additionally indicates its access mode to the MME in the S1AP Path Switch Request message.

2. The new behaviour at the MME in case UE moves from Closed to Hybrid mode and vice versa (within the same CSG) needs to be defined.

Solution: Issue 2 requires defining new MME behaviour (in SA2 specs 23.401) for the X2 based HO for HeNBs. Therefore, once there is an agreement in RAN3 on the solution, SA2 needs to be informed by sending an LS.

Proposal 2: If Proposal 1 is agreed, send an LS to SA2 informing about the solution agreed in RAN3 for X2 based mobility for HeNBs (proposal 1).

3. 3 Conclusion and Proposals

In this paper, we have analysed the inter-HeNB mobility solution direct X2 interface between two HeNBs in order to optimize the intra-CSG scheme where no access control is needed. Based on the analysis, for the intra CSG mobility scenario (closed ⇔ hybrid), it is proposed following:

Proposal 1: During the X2 based HOs for the (H)eNB, the target (H)eNB additionally indicates its access mode to the MME in the S1AP Path Switch Request message.

Proposal 2: If Proposal 1 is agreed, send an LS to SA2 informing about the solution agreed in RAN3 for X2 based mobility for HeNBs (proposal 1).

The sources companies have provided the Stage-2/Stage-3 CRs and Draft LS (to SA2) in R3-103528, R3-103529 and R3-103530.

4. 4 References

[1] TS 36.413 Evolved Universal Terrestrial Radio Access Network (E-UTRAN); S1 Application Protocol (S1AP)
[2] TS 36.300 Evolved Universal Terrestrial Radio Access (E-UTRA) and Evolved Universal Terrestrial Radio Access Network (E-UTRAN); Overall description; Stage 2
[3] TS 23.401 General Packet Radio Service (GPRS) enhancements for Evolved Universal Terrestrial Radio Access Network (E-UTRAN) access

What is claimed is:

1. A base station for communicating with a mobile station, the base station comprising:
a processor configured to generate, when the base station is operating as a target base station, a path switch request that includes a tracking area identity (TAI), an E-UTRAN cell global identifier (ECGI), a list of Evolved Packet System (EPS) bearers to be switched, and a closed subscriber group (CSG) access mode of the base station when operating as the target base station; and
a transceiver circuit configured to transmit, when the mobile station is engaged in a handover to the base station when operating as a target base station, the path switch request that includes the TAI, the ECGI, the list of EPS bearers to be switched, and the CSG access mode, to a Mobility Management Entity (MME),
wherein the list of EPS bearers to be switched comprises, for each EPS bearer, a respective transport layer address and a respective tunnel end point identifier.

2. The base station of claim 1 wherein the base station operates according to one of an open, closed or a hybrid CSG access mode and the other base station operates in a respective other one of the open, closed and hybrid CSG access modes.

3. The base station of claim 2 wherein the CSG access mode of one base station is closed and the CSG access mode of the other base station is hybrid.

4. A mobility management entity (MME) for a communications network comprising a core network and a plurality of base stations, said mobility management entity comprising:
a memory, adapted to store closed subscriber group (CSG) information;
wherein the controller is configured to:
receive a path switch request from a target base station, wherein the path switch request received from the target base station includes a tracking area identity (TAI), an EUTRAN cell global identifier (ECGI), a list of Evolved Packet System (EPS) to be switched, and a CSG access mode of the target base station;

determine CSG membership based on a CSG ID and the CSG access mode received in the path switch request from the target base station; and update the stored CSG information in the event that a mobile device is handed over from a source base station to the target base station, wherein the stored CSG information is updated based on the CSG access mode of the target base station, wherein the list of EPS bearers to be switched comprises, for each EPS bearer, a respective transport layer address and a respective tunnel end point identifier.

5. A communications system comprising:
a mobile device;
a plurality of base stations according to claim 1; and
a mobility management entity for a communications network comprising a core network and the plurality of base stations, said mobility management entity comprising:
a memory, adapted to store CSG information; and
a controller, configured to update the stored CSG information in the event that said mobile device is handed over from a source base station to the target base station, wherein the stored CSG information is updated based on the CSG access mode of the target base station; wherein the controller is configured: to receive a tracking area identity (TAI), an E-UTRAN cell global identifier (ECGI), a list of Evolved Packet System (EPS) to be switched, and said CSG access mode of the target base station in the path switch request from the target base station,
wherein the list of EPS bearers to be switched comprises, for each EPS bearer, a respective transport layer address and a respective tunnel end point identifier.

6. A communications system according to claim 5, further comprising a serving gateway wherein the mobility management entity is operable, in response to said handover, to send a message to the serving gateway CSG information which includes said CSG access mode.

7. A communications system according to claim 5 further comprising a packet data network gateway and wherein the serving gateway is configured to send a message to the packet data network gateway including said CSG access mode.

8. A method of operating a base station for communicating with a mobile station, the method comprising:
generating, when the base station is operating as a target base station, a path switch request that includes a tracking area identity (TAI), an E-UTRAN cell global identifier (ECGI), a list of Evolved Packet System (EPS) to be switched, and a closed subscriber group (CSG) access mode of the base station when operating as the target base station; and transmitting, when the mobile station is engaged in a handover to the base station when operating as a target base station, the path switch request that includes the TAI, the ECGI, the list of EPS bearers to be switched, and the CSG access mode, to a Mobility Management Entity (MME);

wherein the path switch request includes the TAI, the ECGI, the list of EPS bearers to be switched, and the CSG access mode of the base station operating as a target base station, and wherein the list of EPS bearers to be switched comprises, for each EPS bearer, a respective transport layer address and a respective tunnel end point identifier.

9. A method of operating a mobility management entity (MME) for a communications network comprising a core network and a plurality of base stations, the method comprising:
receiving a path switch request from a target base station, wherein the path switch request received from the target base station includes a tracking area identity (TAI), an EUTRAN cell global identifier (ECGI), a list of EPS bearers to be switched, and a closed subscriber group (CSG) access mode of the target base station;

determining CSG membership based on a CSG ID and the CSG access mode received in the path switch request from the target base station;

updating stored CSG information in the event that a mobile device is handed over from a source base station to the target base station, wherein the stored CSG information is updated based on the CSG access mode of the target base station, wherein the list of EPS bearers to be switched comprises, for each EPS bearer, a respective transport layer address and a respective tunnel end point identifier.

10. A computer program product embodied on a non-transitory computer readable medium comprising instructions operable to program a programmable processor to perform a method according to claim 8.

11. A mobile communication device comprising a communication module for communicating with a base station according to claim 1, and another base station that operates as a source base station, in pursuit of handover of the mobile communication device between said base station according to claim 1 and said base station that operates as a source base station.

* * * * *

UNITED STATES PATENT AND TRADEMARK OFFICE
CERTIFICATE OF CORRECTION

PATENT NO. : 10,708,833 B2
APPLICATION NO. : 14/981385
DATED : July 7, 2020
INVENTOR(S) : Vivek Jha Page 1 of 1

It is certified that error appears in the above-identified patent and that said Letters Patent is hereby corrected as shown below:

In the Specification

Column 13, Best Mode for Carrying out the Invention, Line 47; Delete "SLAP" and insert --S1AP-- therefor Signed and Sealed this
Seventeenth Day of November, 2020

Andrei Iancu
*Director of the United States Patent and Trademark Office*